Patented Sept. 5, 1933

1,925,801

UNITED STATES PATENT OFFICE 1,925,801

ARYLIDES OF HYDROXYNAPHTHOIC ACIDS

Ernest F. Grether, Midland, Mich., assignor to The Dow Chemical Company, Midland, Mich., a corporation of Michigan No Drawing. Original application February 2, 1931, Serial No. 513,055. Divided and this application April 18, 1932. Serial No. 606,077

6 Claims. (Cl. 260—124)

The present invention concerns new arylides of hydroxynaphthoic acids from which azo dyes of the direct developed type may be formed by coupling diazotized or polyazotized aromatic amines therewith. The present invention particularly concerns the 3-halo-4-phenoxy-anilides of hydroxynaphthoic acids, and the invention more particularly concerns such anilides of 2.3-hydroxynaphthoic acid.

It is well known that azo dyes which are fast to light and washing may be produced by coupling diazotized aromatic amines with arylides such as naphthol AS, the latter being the anilide of 2.3-hydroxynaphthoic acid. In a co-pending application, Serial No. 513,055, filed February 2, 1931, of which the present application is a division, I have disclosed that the 3-halo-4-phenoxyanilides of hydroxynaphthoic acid may be coupled with diazotized aromatic amines to form a new class of valuable azo dyes, and have claimed the dyes so formed. I am claiming herein the new arylides from which such dyes were formed, said arylides having the general formula;—

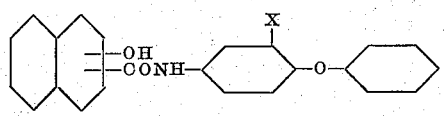

wherein X represents a halogen.

The present invention, then, consists of the new products, together with the methods of preparing the same, hereinafter fully described and particularly pointed out in the claims, the following description setting forth but several of the various ways in which the principle of the invention may be used.

An arylide of the present class may be prepared through reacting a 3-halo-4-phenoxy-aniline with a hydroxynaphthoyl chloride, e. g. 2.3-hydroxynaphthoyl chloride, or with the free hydroxy-naphthoic acid in the presence of a condensing agent, e. g. phosphorous trichloride, and in the presence of a substantially inert solvent, such as toluene, xylene, etc.

The follownig specific example illustrates one of the several ways in which the invention may be utilized:—

*Example*

The 3-chloro-4-phenoxy-anilide of 2.3-hydroxynaphthoic acid was prepared by heating under reflux substantially equimolecular quantities of 3-chloro-4-phenoxy-aniline and 2.3-hydroxynaphthoic acid, in the presence of about 13 per cent of their combined weight (slightly more than one-third of a molecular equivalent) of phosphorous trichloride, with stirring, and in the presence of sufficient toluene to permit such stirring, for a period of from 3 to 5 hours. The reaction product was neutralized by adding an excess of sodium carbonate and the toluene removed by distilling with steam. The aqueous residue, containing the arylide product in suspension therein, was filtered and the residue washed with water. The product was then purified by dissolving the same in dilute, 1 to 2 per cent, caustic alkali solution, preferably in the presence of alcohol, filtering from unreacted 3-chloro-4-phenoxy-aniline and precipitating by acidification of the alkaline solution. The anilide so obtained, having a melting point of approximately 210°–212° C., is a fine powder, nearly white in color. It has probably the formula;—

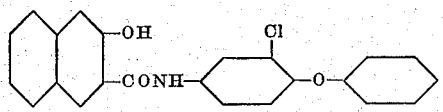

The principle of my invention may be employed in ways other than that specifically described in the example. For instance, the condensation of a hydroxynaphthoic acid with a 3-halo-4-phenoxy-aniline may be carried out in the presence of other condensing agents e. g. phosphorous pentoxide, phosphorous oxychloride, thionyl chloride, etc., in place of phosphorous trichloride, as described. Other hydroxynaphthoic acids, e. g. 1.2-hydroxynaphthoic acid, etc., may be condensed with a 3-halo-4-phenoxy-aniline, to form an arylide of the hydroxynaphthoic acid. Furthermore, other 3-halo-4-phenoxy-anilines, e. g. 3-bromo-4-phenoxy-aniline, may be condensed with a hydroxynaphthoic acid to form an arylide of the latter, the procedure involved being similar to that already described.

Other modes of applying the principle of my invention may be employed instead of those explained, change being made as regards the method herein disclosed, provided the step or steps stated by any of the following claims, or the equivalent of such stated step or steps be employed.

I therefore particularly point out and distinctly claim as my invention:—

1. In a method of making an arylide having the general formula;—

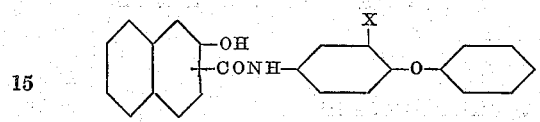

wherein X represents a halogen group, the step which consists in condensing a 3-halo-4-phenoxy-aniline with an ortho hydroxynaphthoic acid in the presence of a condensing agent.

2. In a method of making an arylide having the general formula;—

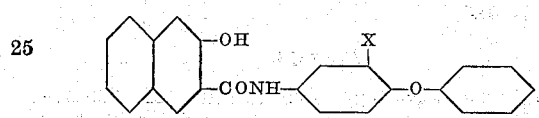

wherein X represents a halogen group, the step which consists in condensing a 3-halo-4-phenoxy-aniline with 2.3-hydroxynaphthoic acid in the presence of a condensing agent selected from the group consisting of phosphorous trichloride, phosphorous pentoxide, phosphorous oxychloride, and thionyl chloride.

3. In a method of making the 3-chloro-4-phenoxy-anilide of 2.3-hydroxynaphthoic acid, having probably the formula;—

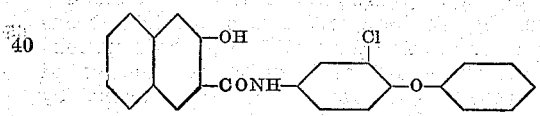

the step which consists in condensing 3-chloro-4-phenoxy-aniline with 2.3-hydroxynaphthoic acid in the presence of phosphorous trichloride as a condensing agent.

4. As a new compound, an arylide of an ortho hydroxynaphthoic acid having the general formula;—

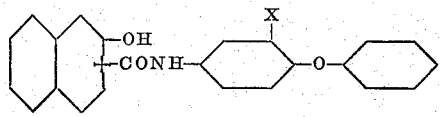

wherein X represents a halogen group.

5. As a new compound, an arylide of 2.3-hydroxynaphthoic acid having the general formula;—

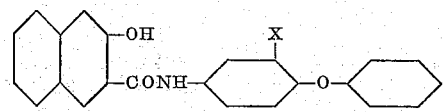

wherein X represents a halogen group.

6. As a new compound, the 3-chloro-4-phenoxy-anilide of 2.3-hydroxynaphthoic acid having probably the formula;—

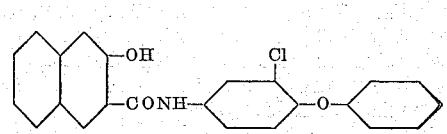

and having a melting point of approximately 210°–212° C.

ERNEST F. GRETHER.